US 11,470,582 B2

United States Patent
Tang et al.

(10) Patent No.: US 11,470,582 B2
(45) Date of Patent: Oct. 11, 2022

(54) USER DEVICE, AND METHOD FOR INTER-USER-DEVICE SENDING AND RECEIVING OF POSITIONING SIGNAL

(71) Applicant: GUANGDONG OPPO MOBILE TELECOMMUNICATIONS CORP., LTD., Dongguan (CN)

(72) Inventors: Hai Tang, Dongguan (CN); Huei-Ming Lin, Victoria (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 56 days.

(21) Appl. No.: 16/940,278

(22) Filed: Jul. 27, 2020

(65) Prior Publication Data
US 2020/0359367 A1 Nov. 12, 2020

Related U.S. Application Data

(63) Continuation of application No. PCT/CN2018/075494, filed on Feb. 6, 2018.

(51) Int. Cl.
*H04W 72/04* (2009.01)
*H04W 4/46* (2018.01)
*H04L 5/00* (2006.01)

(52) U.S. Cl.
CPC ....... *H04W 72/0406* (2013.01); *H04L 5/0048* (2013.01); *H04W 4/46* (2018.02)

(58) Field of Classification Search
CPC .............. G01S 5/0236; H04W 64/006; H04W 72/0406; H04W 92/18; H04W 76/14;
(Continued)

(56) References Cited

U.S. PATENT DOCUMENTS 10,314,089 B2 * 6/2019 Zhang ...................... H04W 4/70
10,448,229 B2 * 10/2019 Wei ......................... H04W 76/14
(Continued)

FOREIGN PATENT DOCUMENTS

CN 106303918 A 1/2017
CN 107205275 A 9/2017
(Continued)

OTHER PUBLICATIONS

Extended European Search Report issued in corresponding European Application No. EP 18 90 5737, dated Dec. 22, 2020, 11 pages.
(Continued)

*Primary Examiner* — Man U Phan
(74) *Attorney, Agent, or Firm* — Bayes PLLC (57) ABSTRACT

The present application relates to the field of wireless communications. Disclosed are a user device and a method for the inter-user-device sending and receiving of a positioning signal. In the present application, a first user device sends a positioning reference signal on a communication interface, and performs information transmission on a physical sidelink control channel (PSCCH) and/or a physical sidelink shared channel (PSSCH), wherein the information transmission on the PSCCH and/or PSSCH indicates a relevant attribute of the positioning reference signal. By means of direct communication between a user device and another user device, mutual positioning between the user devices is achieved, thereby achieving higher spectral efficiency and lower transmission delay, so that a higher positioning precision can be reached.

16 Claims, 4 Drawing Sheets

(58) Field of Classification Search
CPC ...... H04W 4/46; H04W 72/04; H04L 5/0048; H04L 5/0094; H04L 27/2613; H04L 5/0007; H04L 5/0051; H04L 5/00
USPC .......................................................... 370/329
See application file for complete search history.

(56) References Cited

U.S. PATENT DOCUMENTS

| | | | |
|---|---|---|---|
| 10,531,258 B2* | 1/2020 | Ryu | H04L 67/53 |
| 10,624,100 B2* | 4/2020 | Chae | H04L 5/0023 |
| 10,893,390 B2* | 1/2021 | Lee | H04L 5/0055 |
| 10,939,417 B2* | 3/2021 | Chae | H04B 17/327 |
| 11,026,217 B2* | 6/2021 | Chae | H04W 72/042 |
| 11,032,049 B2* | 6/2021 | Zhang | H04L 5/0091 |
| 2016/0095080 A1 | 3/2016 | Khoryaev et al. | |
| 2016/0095092 A1 | 3/2016 | Khoryaev et al. | |
| 2016/0295624 A1 | 10/2016 | Novlan et al. | |
| 2018/0020423 A1 | 1/2018 | Wang et al. | |
| 2019/0246253 A1 | 8/2019 | Ryu et al. | |
| 2020/0037343 A1* | 1/2020 | He | H04L 1/1893 |
| 2020/0374850 A1* | 11/2020 | Khoryaev | H04W 72/048 |
| 2021/0058889 A1* | 2/2021 | Zhang | G01S 5/0236 |
| 2021/0058891 A1* | 2/2021 | Huang | H04W 24/10 |
| 2021/0076359 A1* | 3/2021 | Sosnin | G01S 19/42 |
| 2021/0243728 A1* | 8/2021 | Lee | H04L 5/0044 |

FOREIGN PATENT DOCUMENTS

| | | |
|---|---|---|
| CN | 107371137 A | 11/2017 |
| EP | 3 174 352 A1 | 5/2017 |
| WO | 2017029036 A1 | 2/2017 |
| WO | 2017142285 A1 | 8/2017 |
| WO | 2019/153129 A1 | 8/2019 |

OTHER PUBLICATIONS

International Search Report issued in corresponding International Application No. PCT/CN2018/075494, dated Nov. 2, 2018, 4 pages.
Written Opinion of the International Searching Authority issued in corresponding International Application No. PCT/CN2018/075494, dated Nov. 2, 2018, 6 pages.
"New SID: Study on NR V2X", Agenda Item: 9.1.5, Source: Vodafone, 3GPP TSG RAN Meeting #80, RP-181480 (Revision of RP-181429), La Jolla, USA, Jun. 11-14, 2018, 5 pages.

* cited by examiner

USER DEVICE, AND METHOD FOR INTER-USER-DEVICE SENDING AND RECEIVING OF POSITIONING SIGNAL

CROSS-REFERENCE TO RELATED APPLICATIONS

This application is continuation of International Application No. PCT/CN2018/075494, filed on Feb. 6, 2018, which is hereby incorporated by reference in its entirety.

BACKGROUND

The present application relates to the field of wireless communication, and in particular to a technology for inter-user-device sending and receiving a positioning signal.

Internet of Vehicles (IoV) system is a sidelink (SL) transmission technology based on LTE-D2D, which is different from a traditional LTE system in which communication data is received or sent through a base station. The IoV system uses a Device to Device (D2D) direct communication method, so it has higher spectral efficiency and lower transmission delay.

Position of vehicles can be determined by an on-board device through satellite positioning technology (such as GPS, Beidou, etc.)

SUMMARY

A purpose of the present application is to provide a user device and a method for inter-user-device sending and receiving a positioning signal.

In order to solve the above problem, the present application discloses a method for inter-user-device sending of a positioning signal, including a first user device sending a positioning reference signal on a communication interface, and performing information transmission on a physical sidelink control channel (PSCCH) and/or a physical sidelink shared channel (PSSCH), wherein the information transmission on the PSCCH and/or PSSCH indicates a relevant attribute of the positioning reference signal.

The present application further discloses a method for inter-user-device receiving of a positioning signal, including a second user device receiving a positioning reference signal on a communication interface, and performing information reception on a physical sidelink control channel (PSCCH) and/or a physical sidelink shared channel (PSSCH) corresponding to a first user device; the second user device determining a relevant attribute of the positioning reference signal according to the information reception on the PSCCH and/or PSSCH.

The present application further discloses a user device, including a first sending module, configured to send a positioning reference signal on a communication interface; a second sending module, configured to perform information transmission on a physical sidelink control channel (PSCCH) and/or a physical sidelink shared channel (PSSCH), wherein the information transmission on the PSCCH and/or PSSCH indicates a relevant attribute of the positioning reference signal.

The present application further discloses a user device, including a first receiving module, configured to receive a positioning reference signal on a communication interface; a second receiving module, configured to perform information reception on a physical sidelink control channel (PSCCH) and/or a physical sidelink shared channel (PSSCH); a determining module, configured to determine a relevant attribute of the positioning reference signal according to the information reception on the PSCCH and/or PSSCH.

The present application further discloses a computer storage medium on which computer-executable instructions are stored, and when the computer-executable instructions are executed by a processor, the method steps of the above aspects are implemented.

DETAILED DESCRIPTION

In the following description, many technical details are proposed in order for the reader to better understand this application. However, those of ordinary skill in the art may understand that even without these technical details and various changes and modifications based on the following embodiments, the technical solutions claimed in this application may be implemented.

Explanation of some terms:
LTE: Long Term Evaluation
V2V: Vehicle to Vehicle
V2X: Vehicle to Everything
D2D: Device to Device
SA: Scheduling Assignment
DCI: Downlink Control Information
SCI: Sidelink Control Information
PSCCH: Physical Sidelink Control Channel
PSSCH: Physical Sidelink Shared Channel
PDCP: Packet Data Convergence Protocol
RLC: Radio Link Control
SL: Sidelink
UE: User Equipment
PRS: Positioning Reference Signal
DMRS: Demodulation Reference Signal
CS: Cyclic Shift The following briefly introduces exemplary application scenarios of this application. In 3GPP Rel-14, the technology of Vehicle to Everything (V2X) was standardized, and two transmission modes were defined: Mode 3 and Mode 4, specifically, as described below.

Figure 1:
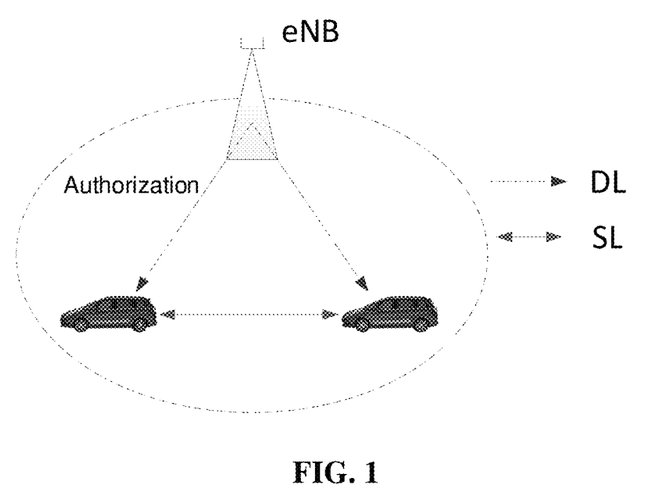
FIG. 1 a schematic diagram of Mode 3 in a 5G communication system.

Mode 3: As shown in FIG. 1, transmission resources of a vehicle-mounted terminal are allocated by a base station, and the vehicle-mounted terminal performs data transmission on a sidelink according to the resources allocated by the base station; the base station may allocate single transmission resources for the terminal or may allocate semi-static transmission resources for the terminal.

Figure 2:
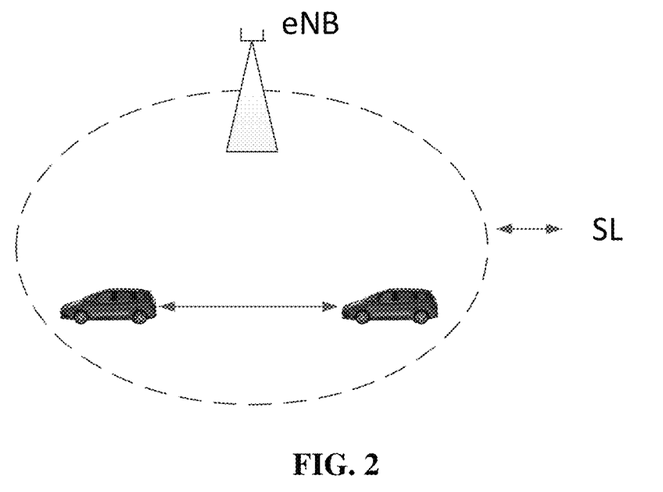
FIG. 2 is a schematic diagram of Mode 4 in a 5G communication system.

Mode 4: As shown in FIG. 2, a vehicle-mounted terminal adopts a transmission method of sensing+reservation. The vehicle-mounted terminal obtains a set of available transmission resources in a resource pool by a method of sensing, and the terminal randomly selects a resource from the set for data transmission. Because services in an Internet of Vehicles (IoV) system have periodic characteristics, the terminal usually adopts a semi-static transmission. That is, after selecting a transmission resource, the terminal will continuously use the resource in a plurality of transmission cycles, thereby reducing the probability of resource reselection and resource conflict. The terminal will carry information reserved for next transmission in control information transmitted this time, so that other terminals may determine whether this resource is reserved and used by a user by detecting the user's control information, so as to reduce the purpose of resource conflict.

To make the objectives, technical solutions, and advantages of the present application clearer, the embodiments of the present disclosure will be described in further detail below with reference to the accompanying drawings.

First of all, it needs to be explained that in various embodiments of the present application, user devices mentioned may be various, such as smartphones, tablets, desktop computers, notebook computers, customized wireless terminals, Internet of Things nodes, wireless communication modules, as long as each other may perform wireless communication according to an agreed communication protocol.

The technical solution of the present application may (but is not limited to) be applied to an IoV system.

Figure 3:
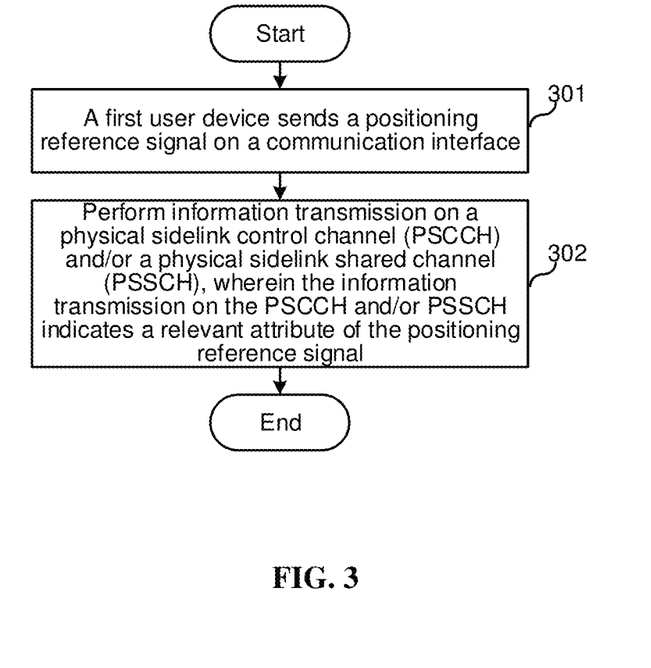
FIG. 3 is a schematic flowchart of a method for inter-user-device sending of a positioning signal in a first embodiment of the present application.

A first embodiment of the present application relates to a method for inter-user-device sending of a positioning signal. FIG. 3 is a schematic flowchart of the method for the inter-user-device sending of the positioning signal.

Specifically, as shown in FIG. 3, the method for the inter-user-device sending of the positioning signal includes Step 301, a first user device sending a positioning reference signal on a communication interface; Step 302, performing information transmission on a physical sidelink control channel (PSCCH) and/or a physical sidelink shared channel (PSSCH), wherein the information transmission on the PSCCH and/or PSSCH indicates a relevant attribute of the positioning reference signal.

It should be noted that there is no necessary precedence relationship between Step 301 and Step 302. The positioning reference signal may be sent first, and then the information transmission may be performed on the PSCCH and/or PSSCH; the information transmission may also be performed on the PSCCH and/or PSSCH first, and then the positioning reference signal may be sent; it is also possible to simultaneously send the positioning reference signal and perform the information transmission on the PSCCH and/or PSSCH. After that, this process is ended.

In Step 301, the communication interface refers to a communication interface between the user devices. In this embodiment, it is a PC5 interface.

In Step 302, the first user device has a corresponding PSCCH and/or PSSCH, and the information transmission is performed on the PSCCH and/or PSSCH corresponding to the first user device. The information transmission includes a correspondence between the PSCCH and/or PSSCH and the positioning reference signal (PRS). In other words, in Step 302, by determining the correspondence between the PSCCH and/or PSSCH and the PRS, a correspondence between a sending UE (first user device) and the PRS is determined.

The relevant attribute of the positioning reference signal includes at least one of the following: time position, frequency position, and signal sequence of the positioning reference signal.

Step 302 may be implemented in various ways. The following is an example. A first implementation manner of Step 302 may be that a time position and/or frequency position of performing the information transmission on the PSCCH and/or PSSCH indicates the relevant attribute of the positioning reference signal. In other words, the relevant attribute of the positioning reference signal may be obtained implicitly by the time position and/or frequency position of performing the information transmission on the PSCCH and/or PSSCH. There may also be various embodiments of the first implementation manner, as described below.

Embodiment 1: A time position of the positioning reference signal is the same as the time position of performing the information transmission on the PSCCH and/or PSSCH; or, there is a one-to-one correspondence between the time position of the positioning reference signal and the time position of performing the information transmission on the PSCCH and/or PSSCH.

Embodiment 2: The PSCCH schedules the positioning reference signal independently; or, the PSCCH schedules the PSSCH, while correspondingly positioning reference signal.

Embodiment 3: A frequency position of the positioning reference signal is the same as the frequency position of performing the information transmission on the PSCCH and/or PSSCH; or, there is a one-to-one correspondence between the frequency position of the positioning reference signal and the frequency position of performing the information transmission on the PSCCH and/or PSSCH.

Embodiment 4: The frequency position of the positioning reference signal is different from the frequency position of performing the information transmission on the PSCCH and/or PSSCH. For example, the positioning reference signal occupies a larger bandwidth than the PSCCH and/or PSSCH. Or, the positioning reference signal occupies a full bandwidth of the PSCCH and/or PSSCH. In this case, only the first user device allocated with a specific time position and/or frequency position of the PSSCH and/or PSSCH may be allowed to send the positioning reference signal.

A second implementation manner of Step 302 may be that content of information transmitted by the PSCCH and/or PSSCH indicates the relevant attribute of the positioning reference signal. In other words, the relevant attribute of the positioning reference signal may be obtained explicitly by the content of the information transmitted by the PSCCH and/or PSSCH. There may also be various embodiments of the second implementation manner, as described below:

Embodiment 1: A time position of the positioning reference signal is indicated by the content of the information transmitted by the PSCCH and/or PSSCH.

Embodiment 2: A frequency position of the positioning reference signal is indicated by the content of the information transmitted by the PSCCH and/or PSSCH.

Embodiment 3: A signal sequence of the positioning reference signal is a specific bit included in the information transmitted by the PSCCH and/or PSSCH, or may be derived from other information included in the information transmitted by the PSCCH and/or PSSCH.

A situation where the signal sequence of the positioning reference signal is derived from other information included in the information transmitted by the PSCCH and/or PSSCH, for example, may be derived from user identification information included in the information transmitted by the PSCCH and/or PSSCH. For example, assuming that there are 8 signal sequences in a sending data block and the user identification information is 1 byte (8 bits) in length, the result obtained, by performing a modulo operation for a value of the user identification information with 8 bits, is 7, and the PRS is a seventh signal sequence in the sending data block. Or, it may also be derived from characteristics of DMRS included in the information transmitted by the PSCCH and/or PSSCH, for example, by Cyclic Shift (CS) of the DMRS.

Alternatively, in addition to the signal sequence, the remaining relevant attributes of the positioning reference signal may also be specific bits included in the information transmitted by the PSCCH and/or PSSCH.

Alternatively, the remaining relevant attributes of the positioning reference signal may also be derived from other information included in the information transmitted by the PSCCH and/or PSSCH. For example, it may be derived from the user identification information included in the information transmitted by the PSCCH and/or PSSCH. For another example, it may also be derived from the characteristics of the DMRS included in the information transmitted by the PSCCH and/or PSSCH, for example, by the CS of the DMRS.

Embodiment 4: The PSCCH schedules the positioning reference signal independently; or, the PSCCH schedules the PSSCH while correspondingly positioning reference signal.

Embodiment 5: The frequency position of the positioning reference signal is the same as the frequency position of performing the information transmission on the PSCCH and/or PSSCH; or, there is a one-to-one correspondence between the frequency position of the positioning reference signal and the frequency position of performing the information transmission on the PSCCH and/or PSSCH.

Embodiment 6: The frequency position of the positioning reference signal is different from the frequency position of performing the information transmission on the PSCCH and/or PSSCH. For example, the positioning reference signal occupies a larger bandwidth than the PSCCH and/or PSSCH. Or, the positioning reference signal occupies a full bandwidth of the PSCCH and/or PSSCH. In this case, only the first user device allocated with a specific time position and/or frequency position of the PSSCH and/or PSSCH may be allowed to send the positioning reference signal.

In addition, it should be noted that the two implementations of Step 302 listed above may be used in combination. For example, the time-frequency position of the PRS may be obtained implicitly through a time-frequency position of performing the information transmission on the PSCCH and/or PSSCH, and a signal sequence of the PRS may be obtained explicitly by the content of the information transmitted by the PSCCH and/or PSSCH; or conversely, the signal sequence of the PRS is obtained implicitly by the time-frequency position of performing the information transmission on the PSCCH and/or PSSCH, and the time-frequency position of the PRS is explicitly obtained by the content of the information transmitted by the PSCCH and/or PSSCH.

In this way, a receiving user device (second user device) may learn the time-frequency position and signal sequence of the PRS through the PSCCH and/or PSSCH, and the correspondence between a sending UE (sending user device, namely first user device) and the PRS, thereby achieving to send the positioning signal between the user devices for mutual positioning between the user devices.

A second embodiment of the present application relates to a method for inter-user-device receiving of a positioning signal.

Figure 4:
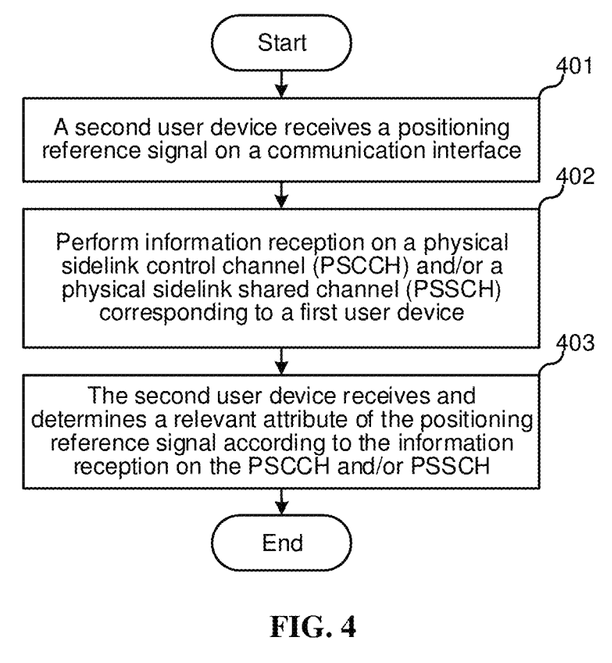
FIG. 4 is a schematic flowchart of a method for inter-user-device receiving of a positioning signal in a second embodiment of the present application.

The first embodiment is the method for the inter-user-device sending of the positioning signal, and the second embodiment is the method for the inter-user-device receiving of the positioning signal. The two are a corresponding process, their technical concepts are consistent, and related details may be used interchangeably. FIG. 4 is a schematic flowchart of the method for the inter-user-device receiving of the positioning signal.

Specifically, as shown in FIG. 4, the method for the inter-user-device receiving of the positioning signal includes Step 401, a second user device receiving a positioning reference signal on a communication interface; Step 402, performing information reception on a physical sidelink control channel (PSCCH) and/or a physical sidelink shared channel (PSSCH) corresponding to a first user device.

It should be noted that there is no necessary precedence relationship between Step 401 and Step 402. The positioning reference signal may be received first, and then the information reception may be performed on the PSCCH and/or PSSCH; the information reception also be performed on the PSCCH and/or PSSCH first, and then the positioning reference signal may be received; it is also possible to simultaneously receive the positioning reference signal and perform the information reception on the PSCCH and/or PSSCH.

In Step 403, the second user device receiving and determining a relevant attribute of the positioning reference signal according to the information reception on the PSCCH and/or PSSCH. After that, this process is ended.

In Step 401, the communication interface refers to a communication interface between the user devices. In this embodiment, it is a PC5 interface.

In Step 402, the information reception includes a correspondence between the PSCCH and/or PSSCH and the positioning reference signal (PRS). In Step 403, by determining the correspondence between the PSCCH and/or PSSCH and the PRS, a correspondence between a sending UE (first user device) and the PRS is determined.

It should be noted that the time position, frequency position, and content of information transmitted by the PSCCH and/or PSSCH in the first embodiment of the present application are the same as the time position, frequency position, and content of information received by the PSCCH and/or PSSCH in the first embodiment of the present application.

The relevant attribute of the positioning reference signal includes at least one of the following: time position, frequency position, and signal sequence of the positioning reference signal.

Step 403 may be implemented in various ways. The following is an example.

A first implementation manner of Step 403 may be that the relevant attribute of the positioning reference signal may be determined by the time position and/or frequency position of performing the information reception on the PSCCH and/or PSSCH. In other words, the relevant attribute of the positioning reference signal may be obtained implicitly by the time position and/or frequency position of performing the information reception on the PSCCH and/or PSSCH. There may also be various embodiments of the first implementation manner, as described below.

Embodiment 1: A time position of the positioning reference signal is the same as the time position of performing the information reception on the PSCCH and/or PSSCH; or, there is a one-to-one correspondence between the time position of the positioning reference signal and the time position of performing the information reception on the PSCCH and/or PSSCH.

Embodiment 2: The PSCCH schedules the positioning reference signal independently; or, the PSCCH schedules the PSSCH, while correspondingly positioning reference signal.

Embodiment 3: A frequency position of the positioning reference signal is the same as the frequency position of performing the information reception on the PSCCH and/or PSSCH; or, there is a one-to-one correspondence between the frequency position of the positioning reference signal and the frequency position of performing the information reception on the PSCCH and/or PSSCH.

Embodiment 4: The frequency position of the positioning reference signal is different from the frequency position of performing the information reception on the PSCCH and/or PSSCH. For example, the positioning reference signal occupies a larger bandwidth than the PSCCH and/or PSSCH. Or, the positioning reference signal occupies a full bandwidth of the PSCCH and/or PSSCH. In this case, only the first user device allocated with a specific time position and/or frequency position of the PSSCH and/or PSSCH may be allowed to send the positioning reference signal.

A second implementation manner of Step 403 may be that the relevant attribute of the positioning reference signal may be determined by the content of information received by the PSCCH and/or PSSCH. In other words, the relevant attribute of the positioning reference signal may be obtained explicitly by the content of the information received by the PSCCH and/or PSSCH. There may also be various embodiments of the second implementation manner, as described below.

Embodiment 1: A time position of the positioning reference signal is indicated by the content of the information received by the PSCCH and/or PSSCH.

Embodiment 2: A frequency position of the positioning reference signal is indicated by the content of the information received by the PSCCH and/or PSSCH.

Embodiment 3: A signal sequence of the positioning reference signal is a specific bit included in the information received by the PSCCH and/or PSSCH, or may be derived from other information included in the information received by the PSCCH and/or PSSCH.

A situation where the signal sequence of the positioning reference signal is derived from other information included in the information received by the PSCCH and/or PSSCH, for example, may be derived from user identification information included in the information received by the PSCCH and/or PSSCH. For example, assuming that there are 8 signal sequences in a receiving data block and the user identification information is 1 byte (8 bits) in length, the result obtained, by performing a modulo operation for a value of the user identification information with 8 bits, is 7, and the PRS is a seventh signal sequence in the receiving data block. Or, it may also be derived from characteristics of DMRS included in the information received by the PSCCH and/or PSSCH, for example, by Cyclic Shift (CS) of the DMRS.

Alternatively, in addition to the signal sequence, the remaining relevant attributes of the positioning reference signal may also be specific bits included in the information received by the PSCCH and/or PSSCH.

Alternatively, the remaining relevant attributes of the positioning reference signal may also be derived from other information included in the information received by the PSCCH and/or PSSCH. For example, it may be derived from the user identification information included in the information received by the PSCCH and/or PSSCH. For another example, it may also be derived from the characteristics of the DMRS included in the information received by the PSCCH and/or PSSCH, for example, by the CS of the DMRS.

Embodiment 4: The PSCCH schedules the positioning reference signal independently; or, the PSCCH schedules the PSSCH while correspondingly positioning reference signal.

Embodiment 5: The frequency position of the positioning reference signal is the same as the frequency position of performing the information reception on the PSCCH and/or PSSCH; or, there is a one-to-one correspondence between the frequency position of the positioning reference signal and the frequency position of performing the information reception on the PSCCH and/or PSSCH.

Embodiment 6: The frequency position of the positioning reference signal is different from the frequency position of performing the information reception on the PSCCH and/or PSSCH. For example, the positioning reference signal occupies a larger bandwidth than the PSCCH and/or PSSCH. Or, the positioning reference signal occupies a full bandwidth of the PSCCH and/or PSSCH. In this case, only the first user device allocated with a specific time position and/or frequency position of the PSSCH and/or PSSCH may be allowed to send the positioning reference signal.

In addition, it should be noted that the two implementations of Step 403 listed above may be used in combination. For example, the time-frequency position of the PRS may be obtained implicitly through the time-frequency position of performing information reception on the PSCCH and/or PSSCH, and a signal sequence of the PRS can be obtained explicitly by the content of information reception on the PSCCH and/or PSSCH; or conversely, the signal sequence of the PRS is obtained implicitly by the time-frequency position of performing information reception on the PSCCH and/or PSSCH, and the time-frequency position of the PRS is explicitly obtained by the content of information reception on the PSCCH and/or PSSCH.

In this way, a receiving user device (second user device) may learn the time-frequency position and signal sequence of the PRS through the PSCCH and/or PSSCH, and the correspondence between a sending UE (sending user device, namely first user device) and the PRS, thereby achieving to send the positioning signal between the user devices for mutual positioning between the user devices.

A third embodiment of the present application relates to a user device.

Figure 5:
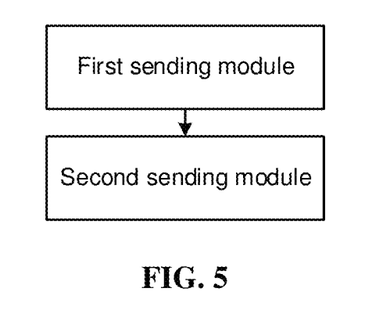
FIG. 5 is a schematic structural diagram of a user device in a third embodiment of the present application.

FIG. 5 is a schematic structural diagram of the user device. Specifically, as shown in FIG. 5, the user device includes a first sending module, configured to send a positioning reference signal on a communication interface, wherein the communication interface refers to a communication interface between a user device and another user device, and in this embodiment, it is a PC5 interface; a second sending module, configured to perform information transmission on a physical sidelink control channel (PSCCH) and/or a physical sidelink shared channel (PSSCH), wherein the information transmission on the PSCCH and/or PSSCH indicates a relevant attribute of the positioning reference signal.

The relevant attribute of the positioning reference signal includes at least one of the following: time position, frequency position, and signal sequence of the positioning reference signal.

A second sending module, configured to determine a correspondence between the PSCCH and/or PSSCH and the PRS by determining a correspondence between a sending UE and the PRS. The second sending module may be implemented in various ways. The following is an example A first implementation manner of the second sending module may be that a time position and/or frequency position of performing the information transmission on the PSCCH and/or PSSCH indicates the relevant attribute of the positioning reference signal. In other words, the relevant attribute of the positioning reference signal may be obtained implicitly by the time position and/or frequency position of performing the information transmission on the PSCCH and/or PSSCH. There may also be various embodiments of the first implementation manner, as described below.

Embodiment 1: A time position of the positioning reference signal is the same as the time position of performing the information transmission on the PSCCH and/or PSSCH; or, there is a one-to-one correspondence between the time position of the positioning reference signal and the time position of performing the information transmission on the PSCCH and/or PSSCH.

Embodiment 2: The PSCCH schedules the positioning reference signal independently; or, the PSCCH schedules the PSSCH, while correspondingly positioning reference signal.

Embodiment 3: A frequency position of the positioning reference signal is the same as the frequency position of performing the information transmission on the PSCCH and/or PSSCH; or, there is a one-to-one correspondence between the frequency position of the positioning reference signal and the frequency position of performing the information transmission on the PSCCH and/or PSSCH.

Embodiment 4: The frequency position of the positioning reference signal is different from the frequency position of performing the information transmission on the PSCCH and/or PSSCH. For example, the positioning reference signal occupies a larger bandwidth than the PSCCH and/or PSSCH. Or, the positioning reference signal occupies a full bandwidth of the PSCCH and/or PSSCH. In this case, only the first user device allocated with a specific time position and/or frequency position of the PSSCH and/or PSSCH may be allowed to send the positioning reference signal.

A second implementation manner of the second sending module may be that content of information transmitted by the PSCCH and/or PSSCH indicates the relevant attribute of the positioning reference signal. In other words, the relevant attribute of the positioning reference signal may be obtained explicitly by the content of the information transmitted by the PSCCH and/or PSSCH. There may also be various embodiments of the second implementation manner, as described below.

Embodiment 1: A time position of the positioning reference signal is indicated by the content of the information transmitted by the PSCCH and/or PSSCH.

Embodiment 2: A frequency position of the positioning reference signal is indicated by the content of the information transmitted by the PSCCH and/or PSSCH.

Embodiment 3: A signal sequence of the positioning reference signal is a specific bit included in the information transmitted by the PSCCH and/or PSSCH, or may be derived from other information included in the information transmitted by the PSCCH and/or PSSCH.

A situation where the signal sequence of the positioning reference signal is derived from other information included in the information transmitted by the PSCCH and/or PSSCH, for example, may be derived from user identification information included in the information transmitted by the PSCCH and/or PSSCH. For example, assuming that there are 8 signal sequences in a sending data block and the user identification information is 1 byte (8 bits) in length, the result obtained, by performing a modulo operation for a value of the user identification information with 8 bits, is 7, and the PRS is a seventh signal sequence in the sending data block. Or, it may also be derived from characteristics of DMRS included in the information transmitted by the PSCCH and/or PSSCH, for example, by Cyclic Shift (CS) of the DMRS.

Alternatively, in addition to the signal sequence, the remaining relevant attributes of the positioning reference signal may also be specific bits included in the information transmitted by the PSCCH and/or PSSCH.

Alternatively, the remaining relevant attributes of the positioning reference signal may also be derived from other information included in the information transmitted by the PSCCH and/or PSSCH. For example, it may be derived from the user identification information included in the information transmitted by the PSCCH and/or PSSCH. For another example, it may also be derived from the characteristics of the DMRS included in the information transmitted by the PSCCH and/or PSSCH, for example, by the CS of the DMRS.

Embodiment 4: The PSCCH schedules the positioning reference signal independently; or, the PSCCH schedules the PSSCH while correspondingly positioning reference signal.

Embodiment 5: The frequency position of the positioning reference signal is the same as the frequency position of performing the information transmission on the PSCCH and/or PSSCH; or, there is a one-to-one correspondence between the frequency position of the positioning reference signal and the frequency position of performing the information transmission on the PSCCH and/or PSSCH.

Embodiment 6: The frequency position of the positioning reference signal is different from the frequency position of performing the information transmission on the PSCCH and/or PSSCH. For example, the positioning reference signal occupies a larger bandwidth than the PSCCH and/or PSSCH. Or, the positioning reference signal occupies a full bandwidth of the PSCCH and/or PSSCH. In this case, only the first user device allocated with a specific time position and/or frequency position of the PSSCH and/or PSSCH may be allowed to send the positioning reference signal.

In addition, it should be noted that the two implementations of the second sending module listed above may be used in combination. For example, the time-frequency position of the PRS may be obtained implicitly through the time-frequency position of performing the information transmission on the PSCCH and/or PSSCH, and a signal sequence of the PRS can be obtained explicitly by the content of the information transmitted by the PSCCH and/or PSSCH; or conversely, the signal sequence of the PRS is obtained implicitly by the time-frequency position of performing the information transmission on the PSCCH and/or PSSCH, and the time-frequency position of the PRS is explicitly obtained by the content of the information transmitted by the PSCCH and/or PSSCH.

The first embodiment is a method embodiment corresponding to this embodiment, and this embodiment may be implemented in cooperation with the first embodiment. The relevant technical details mentioned in the first embodiment are still valid in this embodiment, and in order to reduce repetition, they will not be repeated here. Correspondingly, the relevant technical details mentioned in this embodiment may also be applied in the first embodiment.

A fourth embodiment of the present application relates to a user device.

Figure 6:
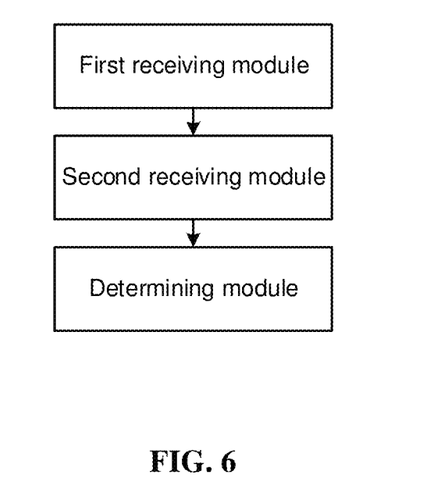
FIG. 6 is a schematic structural diagram of a user device in a fourth embodiment of the present application.

FIG. 6 is a schematic structural diagram of the user device. Specifically, as shown in FIG. 6, the user device includes a first receiving module, configured to receive a positioning reference signal on a communication interface, wherein the communication interface refers to a communication interface between a user device and another user device. In this embodiment, it is a PC5 interface; a second receiving module, configured to perform information reception on a physical side control channel (PSCCH) and/or physical side shared channel (PSSCH); a determining module, configured to receive and determine a relevant attribute of the positioning reference signal according to the information reception on the PSCCH and/or PSSCH.

The relevant attribute of the positioning reference signal includes at least one of the following: time position, frequency position, and signal sequence of the positioning reference signal.

The determining module determines a correspondence between a sending UE (first user device) and the PRS by determining a correspondence between the PSCCH and/or PSSCH and the PRS. The determining module may be implemented in various ways. The following is an example.

A first implementation manner of the determining module may be that the relevant attribute of the positioning reference signal may be determined by the time position and/or frequency position of performing the information reception on the PSCCH and/or PSSCH. In other words, the relevant attribute of the positioning reference signal may be obtained implicitly by the time position and/or frequency position of performing the information reception on the PSCCH and/or PSSCH. There may also be various embodiments of the first implementation manner, as described below.

Embodiment 1: A time position of the positioning reference signal is the same as the time position of performing the information reception on the PSCCH and/or PSSCH; or, there is a one-to-one correspondence between the time position of the positioning reference signal and the time position of performing the information reception on the PSCCH and/or PSSCH.

Embodiment 2: The PSCCH schedules the positioning reference signal independently; or, the PSCCH schedules the PSSCH, while correspondingly positioning reference signal.

Embodiment 3: A frequency position of the positioning reference signal is the same as the frequency position of performing the information reception on the PSCCH and/or PSSCH; or, there is a one-to-one correspondence between the frequency position of the positioning reference signal and the frequency position of performing the information reception on the PSCCH and/or PSSCH.

Embodiment 4: The frequency position of the positioning reference signal is different from the frequency position of performing the information reception on the PSCCH and/or PSSCH. For example, the positioning reference signal occupies a larger bandwidth than the PSCCH and/or PSSCH. Or, the positioning reference signal occupies a full bandwidth of the PSCCH and/or PSSCH. In this case, only the first user device allocated with a specific time position and/or frequency position of the PSSCH and/or PSSCH may be allowed to send the positioning reference signal.

A second implementation manner of the determining module may be that the relevant attribute of the positioning reference signal may be determined by the content of information received by the PSCCH and/or PSSCH. In other words, the relevant attribute of the positioning reference signal may be obtained explicitly by the content of the information received by the PSCCH and/or PSSCH. There may also be various embodiments of the second implementation manner, as described below.

Embodiment 1: A time position of the positioning reference signal is indicated by the content of the information received by the PSCCH and/or PSSCH.

Embodiment 2: A frequency position of the positioning reference signal is indicated by the content of the information received by the PSCCH and/or PSSCH.

Embodiment 3: A signal sequence of the positioning reference signal is a specific bit included in the information received by the PSCCH and/or PSSCH, or may be derived from other information included in the information received by the PSCCH and/or PSSCH.

A situation where the signal sequence of the positioning reference signal is derived from other information included in the information received by the PSCCH and/or PSSCH, for example, may be derived from user identification information included in the information received by the PSCCH and/or PSSCH. For example, assuming that there are 8 signal sequences in a receiving data block and the user identification information is 1 byte (8 bits) in length, the result obtained, by performing a modulo operation for a value of the user identification information with 8 bits, is 7, and the PRS is a seventh signal sequence in the receiving data block. Or, it may also be derived from characteristics of DMRS included in the information received by the PSCCH and/or PSSCH, for example, by Cyclic Shift (CS) of the DMRS.

Alternatively, in addition to the signal sequence, the remaining relevant attributes of the positioning reference signal may also be specific bits included in the information received by the PSCCH and/or PSSCH.

Alternatively, the remaining relevant attributes of the positioning reference signal may also be derived from other information included in the information received by the PSCCH and/or PSSCH. For example, it may be derived from the user identification information included in the information received by the PSCCH and/or PSSCH. For another example, it may also be derived from the characteristics of DMRS included in the information received by the PSCCH and/or PSSCH, for example, by the CS of the DMRS.

Embodiment 4: The PSCCH schedules the positioning reference signal independently; or, the PSCCH schedules the PSSCH while correspondingly positioning reference signal.

Embodiment 5: The frequency position of the positioning reference signal is the same as the frequency position of performing the information reception on the PSCCH and/or PSSCH; or, there is a one-to-one correspondence between the frequency position of the positioning reference signal and the frequency position of performing the information reception on the PSCCH and/or PSSCH.

Embodiment 6: The frequency position of the positioning reference signal is different from the frequency position of performing the information reception on the PSCCH and/or PSSCH. For example, the positioning reference signal occupies a larger bandwidth than the PSCCH and/or PSSCH. Or, the positioning reference signal occupies a full bandwidth of the PSCCH and/or PSSCH. In this case, only the first user device allocated with a specific time position and/or frequency position of the PSSCH and/or PSSCH may be allowed to send the positioning reference signal.

In addition, it should be noted that the two implementations of the determine module listed above may be used in combination. For example, the time-frequency position of the PRS may be obtained implicitly through the time-frequency position of performing information reception on the PSCCH and/or PSSCH, and a signal sequence of the PRS can be obtained explicitly by the content of information reception on the PSCCH and/or PSSCH; or conversely, the signal sequence of the PRS is obtained implicitly by the time-frequency position of performing information reception on the PSCCH and/or PSSCH, and the time-frequency position of the PRS is explicitly obtained by the content of information reception on the PSCCH and/or PSSCH.

The second embodiment is a method embodiment corresponding to this embodiment, and this embodiment may be implemented in cooperation with the second embodiment. The relevant technical details mentioned in the second embodiment are still valid in this embodiment, and in order to reduce repetition, they will not be repeated here. Correspondingly, the relevant technical details mentioned in this embodiment can also be applied in the second embodiment.

It should be noted that the modules mentioned in the device embodiments of the present disclosure are logical modules. Physically, a logical module may be a physical module or a part of a physical module, or combination of multiple physical modules. The physical implementation of these logical modules is not limiting, and the combination of the functions implemented by these logical modules may solve the technical problems proposed by the present disclosure. In addition, in order to highlight the innovative part of the present disclosure, the above device embodiments of the present disclosure do not introduce modules that are not closely related to solving the technical problems proposed by the present disclosure. This does not mean that there are no other modules in the above device embodiments.

It should be noted that those skilled in the art should understand that the implementation functions of the modules shown in the above-mentioned user device implementation modes may be understood by referring to the related descriptions of the foregoing method for inter-user-device sending and receiving of a positioning signal. The functions of the modules shown in the above-mentioned user device implementations can be implemented by programs running on the processor, or by specific logic circuits. If the above user device is implemented in the form of a software function module and sold or used as an independent product in the embodiment of the present disclosure, it may also be stored in a computer-readable storage medium. Based on this understanding, the essence or the part making contributions to the prior art of the technical solutions of the embodiments of the present disclosure may be embodied in the form of software products. The computer software product is stored in a storage medium, and includes several instructions to enable a computer device (which may be a personal computer, server, or network device, etc.) to perform all or part of the methods described in the embodiments of the present disclosure. The foregoing storage media include various media that may store program codes, such as a U disk, a mobile hard disk, a Read-Only Memory (ROM), a magnetic disk, or an optical disk. In this way, the embodiments of the present disclosure are not limited to any specific combination of hardware and software.

Correspondingly, an embodiment of the present disclosure also provides a computer storage medium in which computer-executable instructions are stored. When the computer-executable instructions are executed by a processor, the method for the inter-user-device sending and receiving of the positioning signal is implemented.

It should be noted that in the application documents of this patent, relational terms such as "first" and "second" are only used to distinguish one entity or operation from another entity or operation, and do not necessarily require or imply there is any such actual relationship or order between these entities or operations. Moreover, the terms "include", "include" or any other variant thereof are intended to cover non-exclusive inclusion, so that a process, method, article or device that includes a series of elements includes not only those elements, but also other elements that are not explicitly listed, or include elements inherent to this process, method, article, or equipment. In the absence of more restrictions, the element defined by the sentence "include one" does not exclude that there are other identical elements in the process, method, article or equipment that includes the element. In the application document of this patent, if it is mentioned that an action is performed according to an element, it means that the action is performed at least according to the element, which includes two cases: the behavior is performed based only on the element, and the behavior is performed based on the element and other elements. "More," "multiple," "a plurality of" and other expressions include "two," "twice," "two kinds of" and "more than two," "more than twice," "more than two kinds of."

Compared with the prior art, in the embodiments of the present application, by means of direct communication between a user device and another user device, mutual positioning between the user devices is achieved, thereby achieving higher spectral efficiency and lower transmission delay, so that a higher positioning precision can be reached.

A large number of technical features are recorded in the specification of this application, distributed in various technical solutions. If all possible technical feature combinations (i.e., technical solutions) of this application are listed, the description will be too lengthy. In order to avoid this problem, the technical features disclosed in the above summary of the present application, the technical features disclosed in the following embodiments and examples, and the technical features disclosed in the drawings may be freely combined with each other to form various new technical solutions (these technical solutions are deemed to have been recorded in this specification) unless the combination of such technical features is not technically feasible. For example, if feature A+B+C is disclosed in an example, feature A+B+D+E is disclosed in another example, and features C and D are equivalent technical means that play a same role, technically, only one needs to be chosen for use, and it is impossible to use them simultaneously. Feature E may be technically combined with feature C. Then, the solution of A B+C+D should not be considered as recorded because the technology is not feasible, while the solution of A+B+C+E should be considered as recorded.

All documents mentioned in this application are cited as references in this application, just as each document is individually cited as a reference. In addition, it should be understood that, after reading the above teaching content of the present application, a person skilled in the art may make various changes or modifications to the present application, and these equivalent forms also fall within the scope claimed by the present application.

What is claimed is:

1. A method for inter-user-device sending of a positioning signal, comprising:
    sending, by a first user device, a positioning reference signal on a communication interface; and
    performing information transmission on at least one of a physical sidelink control channel (PSCCH) or a physical sidelink shared channel (PSSCH), wherein the information transmission on the at least one of PSCCH or PSSCH indicates a relevant attribute of the positioning reference signal,
    wherein, the information transmission indicating the relevant attribute of the positioning reference signal, comprises: indicating the relevant attribute of the positioning reference signal by at least one of a time position or frequency position of performing the information transmission on the at least one of PSCCH or PSSCH, or by content of information transmitted by the at least one of PSCCH or PSSCH.

2. The method according to claim 1, wherein, the relevant attribute of the positioning reference signal comprises at least one of time position, frequency position, or signal sequence of the positioning reference signal.

3. The method according to claim 1, wherein, indicating the relevant attribute of the positioning reference signal by the at least one of time position or frequency position of performing the information transmission on the at least one of PSCCH or PSSCH, comprises:
 a time position of the positioning reference signal is the same as the time position of performing the information transmission on the at least one of PSCCH or PSSCH.

4. The method according to claim 1, wherein, indicating the relevant attribute of the positioning reference signal by the at least one of time position or frequency position of performing the information transmission on the at least one of PSCCH or PSSCH, comprises:
 a frequency position of the positioning reference signal is the same as the frequency position of performing the information transmission on the at least one of PSCCH or PSSCH.

5. The method according to claim 1, wherein, indicating the relevant attribute of the positioning reference signal by the at least one of time position or frequency position of performing the information transmission on the at least one of PSCCH or PSSCH, comprises:
 only the first user device allocated with at least one of a specific time position or a specific frequency position of the at least one of PSCCH or PSSCH is allowed to send the positioning reference signal.

6. The method according to claim 1, wherein, the relevant attribute of the positioning reference signal comprises at least one of time position, frequency position, or signal sequence of the positioning reference signal.

7. The method according to claim 1, wherein, indicating the relevant attribute of the positioning reference signal by the content of the information transmitted by the at least one of PSCCH or PSSCH, comprises:
 indicating the relevant attribute of the positioning reference signal by user identification information comprised in the information transmitted by the at least one of PSCCH or PSSCH.

8. The method according to claim 1, wherein, indicating the relevant attribute of the positioning reference signal by the content of the information transmitted by the at least one of PSCCH or PSSCH, comprises:
 indicating the relevant attribute of the positioning reference signal by characteristics of DMRS comprised in the information transmitted by the at least one of PSCCH or PSSCH.

9. The method according to claim 8, wherein, indicating the relevant attribute of the positioning reference signal by the characteristics of the DMRS comprised in the information transmitted by the at least one of PSCCH or PSSCH, comprises:
 indicating the relevant attribute of the positioning reference signal by cyclic shift of the DMRS comprised in the information transmitted by the at least one of PSCCH or PSSCH.

10. A user device, comprising a processor, which when running programs thereon, causes the user device to:
 send a positioning reference signal on a communication interface; and
 perform information transmission on at least one of a physical sidelink control channel (PSCCH) or a physical sidelink shared channel (PSSCH), wherein the information transmission on the at least one of PSCCH or PSSCH indicates a relevant attribute of the positioning reference signal,
 wherein, the information transmission indicating the relevant attribute of the positioning reference signal, comprises:
 indicating the relevant attribute of the positioning reference signal by at least one of a time position or frequency position of performing the information transmission on the at least one of PSCCH or PSSCH, or by content of information transmitted by the at least one of PSCCH or PSSCH.

11. The user device according to claim 10, wherein, the relevant attribute of the positioning reference signal includes at least one of time position, frequency position, or signal sequence of the positioning reference signal.

12. The user device according to claim 10, wherein, indicating the relevant attribute of the positioning reference signal by the at least one of time position or frequency position of performing the information transmission on the at least one of PSCCH or PSSCH, comprises:
 a time position of the positioning reference signal is the same as the time position of performing the information transmission the at least one of PSCCH or PSSCH.

13. The user device according to claim 10, wherein, indicating the relevant attribute of the positioning reference signal by the at least one of time position or frequency position of performing the information transmission on the at least one of PSCCH or PSSCH, comprises:
 a frequency position of the positioning reference signal is the same as the frequency position of performing the information transmission the at least one of PSCCH or PSSCH.

14. The user device according to claim 10, wherein, indicating the relevant attribute of the positioning reference signal by the at least one of time position or frequency position of performing the information transmission on the at least one of PSCCH or PSSCH, comprises:
 only the user device allocated with at least one of a specific time position or a specific frequency position of the at least one of PSCCH or PSSCH is allowed to send the positioning reference signal.

15. The user device according to claim 10, wherein, the relevant attribute of the positioning reference signal comprises at least one of time position, frequency position, or signal sequence of the positioning reference signal.

16. A computer storage medium, on which computer-executable instructions are stored, wherein, when the computer-executable instructions are executed by a processor, perform the steps of:
 sending a positioning reference signal; and
 performing information transmission on at least one of a physical sidelink control channel (PSCCH) or a physical sidelink shared channel (PSSCH), wherein the information transmission on the at least one of PSCCH or PSSCH indicates a relevant attribute of the positioning reference signal,
 wherein, the information transmission indicating the relevant attribute of the positioning reference signal, comprises: indicating the relevant attribute of the positioning reference signal by at least one of a time position or frequency position of performing the information transmission on the at least one of PSCCH or PSSCH, or by content of information transmitted by the at least one of PSCCH or PSSCH.

\* \* \* \* \*